US010979459B2

(12) United States Patent
Jacobs

(10) Patent No.: US 10,979,459 B2
(45) Date of Patent: *Apr. 13, 2021

(54) POLICY MANAGEMENT

(71) Applicant: Sophos Limited, Abingdon (GB)

(72) Inventor: Richard Jacobs, Oxford (GB)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,491

(22) Filed: May 22, 2019

(65) Prior Publication Data

US 2019/0273760 A1    Sep. 5, 2019

Related U.S. Application Data

(63) Continuation of application No. 15/848,922, filed on Dec. 20, 2017, now Pat. No. 10,333,989, and a continuation of application No. 15/849,083, filed on Dec. 20, 2017, now Pat. No. 10,333,990, which is a continuation of application No. 11/855,107, filed on Sep. 13, 2007, now Pat. No. 9,860,274, said application No. 15/848,922 is a continuation of application No. 11/855,107, filed on Sep. 13, 2007, now Pat. No. 9,860,274.

(60) Provisional application No. 60/825,557, filed on Sep. 13, 2006.

(51) Int. Cl.
*H04L 29/06* (2006.01)

(52) U.S. Cl.
CPC ............ *H04L 63/20* (2013.01); *H04L 63/101* (2013.01); *H04L 63/1441* (2013.01)

(58) Field of Classification Search
CPC ....................................................... H04L 63/20
See application file for complete search history.

(56) References Cited

U.S. PATENT DOCUMENTS

| 5,557,742 A | 9/1996 | Smaha et al. |
|---|---|---|
| 5,899,995 A | 5/1999 | Millier et al. |
| 5,941,947 A | 8/1999 | Brown et al. |
| 5,987,611 A | 11/1999 | Freund |

(Continued)

FOREIGN PATENT DOCUMENTS

| JP | 2011034552 | 2/2011 |
|---|---|---|
| WO | WO-2019055157 | 3/2019 |

OTHER PUBLICATIONS

Munich (Types of Software Applications, webarchive, Aug. 11, 2004, 1 page) (Year: 2004).*

(Continued)

*Primary Examiner* — Oleg Korsak
(74) *Attorney, Agent, or Firm* — Strategic Patents, P.C.

(57) ABSTRACT

In embodiments of the present invention improved capabilities are described for the operation of a threat management facility, wherein the threat management facility may provide for a plurality of computer asset protection services to a corporate computer network. The threat management facility may provide a policy management service as one of the plurality of protection services, wherein the policy management service may be adapted to provide corporate policy updates to a plurality of computer facilities associated with the corporate computer network. In addition, the corporate policy updates, and a related corporate policy, may relate to the acceptability of an operation of a computer application.

20 Claims, 4 Drawing Sheets

(56) References Cited

U.S. PATENT DOCUMENTS

| | | |
|---|---|---|
| 5,991,399 A | 11/1999 | Graunke et al. |
| 6,154,844 A | 11/2000 | Touboul et al. |
| 6,185,686 B1 | 2/2001 | Glover |
| 6,195,587 B1 | 2/2001 | Hruska et al. |
| 6,301,668 B1 | 10/2001 | Gleichauf et al. |
| 6,310,873 B1 | 10/2001 | Rainis et al. |
| 6,330,670 B1 | 12/2001 | England et al. |
| 6,381,579 B1 | 4/2002 | Gervais et al. |
| 6,405,318 B1 | 6/2002 | Rowland |
| 6,460,141 B1 | 10/2002 | Olden |
| 6,505,300 B2 | 1/2003 | Chan et al. |
| 6,658,568 B1 | 12/2003 | Ginter et al. |
| 6,658,571 B1 | 12/2003 | Obrien et al. |
| 6,675,218 B1 | 1/2004 | Mahler et al. |
| 6,735,703 B1 | 5/2004 | Kilpatrick et al. |
| 6,775,780 B1 | 8/2004 | Muttik |
| 6,785,821 B1 | 8/2004 | Teal |
| 6,816,973 B1 | 11/2004 | Gleichauf et al. |
| 6,832,373 B2* | 12/2004 | O'Neill .................. G06F 8/654 717/171 |
| 6,895,504 B1 | 5/2005 | Zhang et al. |
| 6,917,980 B1 | 7/2005 | Gusler et al. |
| 6,981,158 B1 | 12/2005 | Sanchez et al. |
| 6,986,052 B1 | 1/2006 | Mittal |
| 7,185,015 B2 | 2/2007 | Kester et al. |
| 7,213,179 B2 | 5/2007 | Song et al. |
| 7,284,008 B2 | 10/2007 | Henkin et al. |
| 7,290,266 B2 | 10/2007 | Gladstone et al. |
| 7,328,451 B2 | 2/2008 | Aaron |
| 7,360,249 B1 | 4/2008 | Szor et al. |
| 7,363,493 B2 | 4/2008 | Dotan |
| 7,398,389 B2 | 7/2008 | Teal et al. |
| 7,464,158 B2 | 12/2008 | Albornoz |
| 7,533,413 B2 | 5/2009 | Samuelsson et al. |
| 7,565,549 B2 | 7/2009 | Satterlee et al. |
| 7,606,225 B2 | 10/2009 | Xie et al. |
| 7,613,930 B2 | 11/2009 | Dotan |
| 7,617,262 B2 | 11/2009 | Prahlad et al. |
| 7,620,983 B1 | 11/2009 | Satish |
| 7,673,001 B1 | 3/2010 | Battle et al. |
| 7,673,137 B2 | 3/2010 | Satterlee et al. |
| 7,698,744 B2 | 4/2010 | Fanton et al. |
| 7,711,952 B2 | 5/2010 | Teal et al. |
| 7,712,133 B2 | 5/2010 | Raikar et al. |
| 7,735,116 B1 | 6/2010 | Gauvin |
| 7,801,894 B1 | 9/2010 | Bone et al. |
| 7,856,661 B1 | 12/2010 | Sebes et al. |
| 7,865,947 B2 | 1/2011 | Fanton et al. |
| 7,917,955 B1 | 3/2011 | Spurlock et al. |
| 8,069,487 B2 | 11/2011 | Fanton et al. |
| 8,079,085 B1 | 12/2011 | Wu et al. |
| 8,136,155 B2 | 3/2012 | Freund |
| 8,151,109 B2 | 4/2012 | Fanton et al. |
| 8,166,304 B2 | 4/2012 | Murase et al. |
| 8,266,676 B2 | 9/2012 | Hardjono et al. |
| 8,272,058 B2 | 9/2012 | Brennan |
| 8,307,437 B2 | 11/2012 | Sebes et al. |
| 8,316,446 B1* | 11/2012 | Campbell .............. G06F 21/554 380/201 |
| 8,321,932 B2 | 11/2012 | Bhargava et al. |
| 8,332,946 B1 | 12/2012 | Boisjolie et al. |
| 8,335,916 B2 | 12/2012 | Brabson et al. |
| 8,566,919 B2 | 10/2013 | Meisel |
| 8,739,274 B2 | 5/2014 | Khemani et al. |
| 8,782,800 B2 | 7/2014 | Brennan et al. |
| 8,950,007 B1 | 2/2015 | Teal et al. |
| 9,058,504 B1 | 6/2015 | Swanson et al. |
| 9,164,909 B1 | 10/2015 | Bolt |
| 9,197,642 B1 | 11/2015 | Urbach |
| 9,374,390 B1 | 6/2016 | Teal et al. |
| 9,507,621 B1 | 11/2016 | Allen |
| 9,665,708 B2 | 5/2017 | Fanton et al. |
| 9,842,203 B2 | 12/2017 | Fanton et al. |
| 9,893,898 B2 | 2/2018 | Kreft |
| 10,063,380 B2 | 8/2018 | Brandwine et al. |
| 2001/0037433 A1 | 11/2001 | Dempsey et al. |
| 2001/0044904 A1 | 11/2001 | Berg et al. |
| 2002/0026436 A1 | 2/2002 | Joory |
| 2002/0049834 A1 | 4/2002 | Molnar |
| 2002/0059330 A1 | 5/2002 | Molnar |
| 2002/0095503 A1 | 7/2002 | Huang |
| 2002/0133535 A1 | 9/2002 | Lucovsky et al. |
| 2002/0178271 A1 | 11/2002 | Graham et al. |
| 2002/0194525 A1 | 12/2002 | Mathiske et al. |
| 2003/0014466 A1 | 1/2003 | Berger et al. |
| 2003/0087629 A1 | 5/2003 | Juitt et al. |
| 2003/0120935 A1 | 6/2003 | Teal et al. |
| 2003/0131245 A1 | 7/2003 | Linderman |
| 2003/0149797 A1 | 8/2003 | Nagarajayya et al. |
| 2003/0177394 A1 | 9/2003 | Dozortsev |
| 2003/0204632 A1 | 10/2003 | Willebeek-lemair et al. |
| 2004/0030776 A1 | 2/2004 | Cantrell et al. |
| 2004/0064731 A1 | 4/2004 | Nguyen et al. |
| 2004/0078536 A1 | 4/2004 | Chen |
| 2004/0093505 A1 | 5/2004 | Hatakeyama et al. |
| 2004/0111643 A1 | 6/2004 | Farmer |
| 2004/0123153 A1 | 6/2004 | Wright et al. |
| 2004/0153835 A1 | 8/2004 | Song et al. |
| 2004/0199763 A1 | 10/2004 | Freund |
| 2004/0260945 A1 | 12/2004 | Raikar et al. |
| 2005/0010752 A1 | 1/2005 | Solsona et al. |
| 2005/0060561 A1 | 3/2005 | Pearson et al. |
| 2005/0108516 A1 | 5/2005 | Balzer et al. |
| 2005/0114338 A1 | 5/2005 | Borthakur et al. |
| 2005/0182931 A1 | 8/2005 | Robert et al. |
| 2005/0188272 A1* | 8/2005 | Bodorin ................ G06F 21/566 714/38.1 |
| 2005/0223239 A1 | 10/2005 | Dotan |
| 2005/0289354 A1 | 12/2005 | Borthakur et al. |
| 2006/0004759 A1 | 1/2006 | Borthakur et al. |
| 2006/0004847 A1 | 1/2006 | Claudatos et al. |
| 2006/0029016 A1 | 2/2006 | Peles |
| 2006/0064582 A1 | 3/2006 | Teal et al. |
| 2006/0075501 A1 | 4/2006 | Thomas et al. |
| 2006/0075504 A1 | 4/2006 | Liu |
| 2006/0090192 A1* | 4/2006 | Corby .................... G06F 21/51 726/1 |
| 2006/0095762 A1 | 5/2006 | Hosokawa et al. |
| 2007/0028291 A1 | 2/2007 | Brennan et al. |
| 2007/0136235 A1 | 6/2007 | Hess |
| 2007/0136455 A1 | 6/2007 | Lee et al. |
| 2007/0143223 A1 | 6/2007 | Bhave et al. |
| 2007/0240217 A1 | 10/2007 | Tuvell et al. |
| 2008/0016059 A1 | 1/2008 | Henkin et al. |
| 2008/0016339 A1 | 1/2008 | Shukla |
| 2008/0037583 A1 | 2/2008 | Dawes et al. |
| 2008/0109679 A1 | 5/2008 | Wright et al. |
| 2008/0109871 A1 | 5/2008 | Jacobs |
| 2008/0127336 A1 | 5/2008 | Sun et al. |
| 2008/0148407 A1 | 6/2008 | Katkar et al. |
| 2008/0235507 A1 | 9/2008 | Ishikawa et al. |
| 2008/0294703 A1 | 11/2008 | Craft et al. |
| 2008/0301468 A1 | 12/2008 | Murase et al. |
| 2009/0049549 A1 | 2/2009 | Park et al. |
| 2009/0089878 A1 | 4/2009 | Monastyrsky et al. |
| 2009/0119748 A1 | 5/2009 | Yao et al. |
| 2009/0126021 A1 | 5/2009 | Albornoz |
| 2009/0187992 A1 | 7/2009 | Poston |
| 2009/0240766 A1 | 9/2009 | Kikkawa et al. |
| 2009/0271620 A1 | 10/2009 | Sudhakar |
| 2009/0303994 A1 | 12/2009 | Xie et al. |
| 2009/0313699 A1 | 12/2009 | Jang et al. |
| 2010/0146269 A1 | 6/2010 | Baskaran |
| 2010/0154026 A1 | 6/2010 | Chatterjee et al. |
| 2010/0212010 A1 | 8/2010 | Stringer et al. |
| 2010/0233472 A1 | 9/2010 | Liu et al. |
| 2010/0251363 A1 | 9/2010 | Todorovic |
| 2010/0262577 A1 | 10/2010 | Pulfer et al. |
| 2010/0293331 A1 | 11/2010 | Fujii et al. |
| 2010/0299292 A1 | 11/2010 | Collazo |
| 2010/0306283 A1 | 12/2010 | Johnson et al. |
| 2010/0332559 A1 | 12/2010 | Fry |
| 2011/0010723 A1 | 1/2011 | Okabe |
| 2011/0023115 A1 | 1/2011 | Wright |

(56) References Cited

U.S. PATENT DOCUMENTS

| | | |
|---|---|---|
| 2011/0023118 A1 | 1/2011 | Wright |
| 2011/0247074 A1 | 10/2011 | Manring et al. |
| 2012/0100910 A1 | 4/2012 | Eichorn et al. |
| 2012/0136993 A1 | 5/2012 | Gao et al. |
| 2012/0185683 A1 | 7/2012 | Krstic et al. |
| 2012/0260331 A1 | 10/2012 | Aaron |
| 2013/0097658 A1 | 4/2013 | Cooper et al. |
| 2013/0227683 A1 | 8/2013 | Bettini et al. |
| 2014/0079370 A1 | 3/2014 | Qian |
| 2014/0123279 A1 | 5/2014 | Bishop et al. |
| 2014/0130157 A1 | 5/2014 | Sallam et al. |
| 2014/0189411 A1 | 7/2014 | Kanchana et al. |
| 2014/0208097 A1 | 7/2014 | Brandwine et al. |
| 2014/0229951 A1 | 8/2014 | Zhang |
| 2014/0310779 A1 | 10/2014 | Lof et al. |
| 2014/0331306 A1 | 11/2014 | Zhao et al. |
| 2014/0337234 A1 | 11/2014 | Tang et al. |
| 2014/0344525 A1 | 11/2014 | Lee et al. |
| 2014/0359222 A1 | 12/2014 | Zachariassen |
| 2014/0366136 A1 | 12/2014 | Wright |
| 2015/0007262 A1 | 1/2015 | Aissi et al. |
| 2015/0012980 A1 | 1/2015 | Mikolajczyk |
| 2015/0074258 A1 | 3/2015 | Ferreira et al. |
| 2015/0135283 A1 | 5/2015 | Tofighbakhsh |
| 2015/0149732 A1 | 5/2015 | Kiperberg et al. |
| 2015/0172300 A1 | 6/2015 | Cochenour |
| 2015/0199532 A1 | 7/2015 | Ismael et al. |
| 2015/0220455 A1 | 8/2015 | Chen et al. |
| 2015/0229646 A1 | 8/2015 | Ely |
| 2015/0237025 A1 | 8/2015 | Pal et al. |
| 2015/0269031 A1 | 9/2015 | Wang et al. |
| 2016/0012232 A1 | 1/2016 | Butcher et al. |
| 2016/0036778 A1 | 2/2016 | Chen et al. |
| 2016/0315880 A1 | 10/2016 | Guo et al. |
| 2016/0323318 A1 | 11/2016 | Terrill et al. |
| 2017/0093892 A1 | 3/2017 | Prokudin |
| 2017/0126740 A1 | 5/2017 | Bejarano Ardila et al. |
| 2017/0180189 A1 | 6/2017 | Hosdurg et al. |
| 2017/0187733 A1 | 6/2017 | Ahn et al. |
| 2017/0237749 A1 | 8/2017 | Wood |
| 2017/0249462 A1 | 8/2017 | Permeh et al. |
| 2017/0302458 A1 | 10/2017 | Berger et al. |
| 2017/0310692 A1 | 10/2017 | Ackerman et al. |
| 2017/0310703 A1 | 10/2017 | Ackerman et al. |
| 2017/0344731 A1 | 11/2017 | Gefflaut et al. |
| 2018/0018475 A1 | 1/2018 | Li |
| 2018/0081829 A1 | 3/2018 | Kaplan |
| 2018/0083922 A1 | 3/2018 | Yin |
| 2018/0139242 A1 | 5/2018 | Jacobs |
| 2018/0189490 A1 | 7/2018 | Maciejak et al. |
| 2018/0205761 A1 | 7/2018 | Jacobs |
| 2018/0217937 A1 | 8/2018 | Koo et al. |
| 2018/0314829 A1 | 11/2018 | Liu et al. |
| 2018/0351969 A1 | 12/2018 | Macleod et al. |
| 2019/0020664 A1 | 1/2019 | Wood |
| 2019/0080102 A1 | 3/2019 | Teal |
| 2019/0081873 A1 | 3/2019 | Kraft |
| 2019/0081928 A1 | 3/2019 | Teal |
| 2019/0081962 A1 | 3/2019 | Teal |
| 2019/0081976 A1 | 3/2019 | Kraft |

OTHER PUBLICATIONS

"U.S. Appl. No. 15/795,918 Final Office Action dated Dec. 12, 2019", 15 pages.
"U.S. Appl. No. 15/795,747 Final Office Action dated Dec. 9, 2019", 17 pages.
"U.S. Appl. No. 15/795,747 Non-Final Office Action dated May 1, 2019", 17 pages.
"U.S. Appl. No. 15/795,791 Non-Final Office Action dated Mar. 28, 2019", 12 pages.
"U.S. Appl. No. 15/795,918 Non-Final Office Action dated Apr. 4, 2019", 15 pages.
"U.S. Appl. No. 15/796,009 Non-Final Office Action dated May 15, 2019", 37 pages.
"U.S. Appl. No. 12/750,062, Final Office Action dated Nov. 28, 2012", 12 pages.
"U.S. Appl. No. 12/750,062, Non-Final Office Action dated Aug. 15, 2012", 14 pages.
ISA, "PCT Application No. PCT/US18/45726 International Search Report and Written Opinion dated Jan. 8, 2019", 17 pages.
"U.S. Appl. No. 12/506,749, Final Office Action dated Sep. 19, 2012", SN:12506749-FOA-091912 Sep. 19, 2012 , 13 pages.
Bayer, Ulrich , "TTAnalyze: A Tool for Analyzing Malware", Master's Thesis Dec. 12, 2005 , 100 pages.
"U.S. Appl. No. 12/750,840, Non-Final Office Action dated Oct. 12, 2012", SN:12750840-NFOA-101212 Oct. 12, 2012 , 11 pgs.
"U.S. Appl. No. 15/848,922 Final Office Action dated Dec. 28, 2018", 8 pages.
"U.S. Appl. No. 15/848,922 Non-Final Office Action dated Jun. 13, 2018", 15 pages.
"U.S. Appl. No. 15/848,922 Notice of Allowance dated Feb. 14, 2019", 10 pages.
"U.S. Appl. No. 15/849,083 Final Office Action dated Dec. 28, 2018", 9 pages.
"U.S. Appl. No. 15/849,083 Notice of Allowance dated Feb. 21, 2019", 10 pages.
"U.S. Appl. No. 11/855,107, Notice of Allowance dated Aug. 25, 2017", 8 pages.
"U.S. Appl. No. 11/855,107 Final Office Action dated Sep. 6, 2016", 16 pages.
"U.S. Appl. No. 11/855,107 Non-Final Office Action dated Aug. 4, 2010", 18 pages.
"U.S. Appl. No. 11/855,107 Non-Final Office Action dated Nov. 7, 2013", 14 pages.
"U.S. Appl. No. 11/855,107 Non-Final Office Action dated Dec. 12, 2014", 16 pages.
"U.S. Appl. No. 11/855,107 Final Office Action dated Jun. 16, 2014", 14 pages.
"U.S. Appl. No. 11/855,107 Final Office Action dated Jul. 16, 2015", 15 pages.
"U.S. Appl. No. 11/855,107 Non-Final Office Action dated Feb. 25, 2016", 14 pages.
"U.S. Appl. No. 12/506,749, Final Office Action dated Oct. 29, 2013", 17 pages.
"U.S. Appl. No. 12/506,749, Non-Final Office Action dated Mar. 28, 2013", 14 pages.
"U.S. Appl. No. 12/506,749, Non-Final Office Action dated Dec. 21, 2011", 11 pages.
"U.S. Appl. No. 12/506,749, Notice of Allowance dated Mar. 28, 2014", 6 pages.
"U.S. Appl. No. 12/750,840, Non-Final Office Action dated Feb. 5, 2013", 11 pages.
"U.S. Appl. No. 12/750,840, Notice of Allowance dated Sep. 13, 2013", 18 pages.
"U.S. Appl. No. 14/324,508, Non-Final Office Action dated May 11, 2015", 19 pages.
"U.S. Appl. No. 14/324,508, Notice of Allowance dated Oct. 6, 2015", 8 pages.
"U.S. Appl. No. 11/855,107, Final Office Action dated Apr. 15, 2011", 18 pages.
"U.S. Appl. No. 11/855,107, Non-Final Office Action dated Feb. 3, 2017", 16 pages.
"U.S. Appl. No. 15/795,836 Non-Final Office Action dated Oct. 7, 2019", 23 pages.
"U.S. Appl. No. 15/796,009 Final Office Action dated Nov. 21, 2019", 40 pages.
"U.S. Appl. No. 15/795,791 Final Office Action dated Oct. 18, 2019", 12 pages.
USPTO, "NPL Searches", Apr. 16, 2020 , 2 pages.
"U.S. Appl. No. 15/795,747 Final Office Action dated Sep. 21, 2020", 20 pages.
"U.S. Appl. No. 15/795,791 Notice of Allowance dated Sep. 10, 2020", 10 pages.
"U.S. Appl. No. 15/795,918 Non-Final Office Action dated Sep. 22, 2020", 17 pages.

(56) References Cited

OTHER PUBLICATIONS

"U.S. Appl. No. 15/795,747 Non-Final Office Action dated Apr. 21, 2020", 17 pages.
"U.S. Appl. No. 15/795,791 Notice of Allowance dated May 14, 2020", 5 pages.
"U.S. Appl. No. 15/795,836 Notice of Allowance dated Apr. 30, 2020", 10 pages.
"U.S. Appl. No. 15/795,836 Notice of Allowance dated Aug. 18, 2020", 8 pages.
"U.S. Appl. No. 15/796,009 Non-Final Office Action dated Jul. 2, 2020", 43 pages.
USPTO, "U.S. Appl. No. 15/795,747 Notice of Allowance dated Jan. 6, 2021", 11 pages.
USPTO, "U.S. Appl. No. 15/796,009 Final Office Action dated Jan. 13, 2021", 43 pages.

\* cited by examiner

POLICY MANAGEMENT

CROSS-REFERENCE TO RELATED APPLICATIONS

This application is a continuation of U.S. patent application Ser. No. 15/848,922, filed Dec. 20, 2017, and U.S. patent application Ser. No. 15/849,083, filed Dec. 20, 2017, each of which is a continuation of U.S. patent application Ser. No. 11/855,107 (now U.S. Pat. No. 9,860,274), filed Sep. 13, 2007, which claims the benefit of U.S. Provisional App. No. 60/825,557, filed Sep. 13, 2006, where the entire contents of each of the foregoing are hereby incorporated herein by reference.

BACKGROUND

Field

The present invention is related to computer security, and more specifically to the control of computer program access.

Description of the Related Art

Over recent years, malware and productivity inhibitors have become a major problem across the internet. From both technical and user positions the categorization of a specific threat, as a virus, worm, spam, phish, spyware, adware, or the like, may becoming reduced in significance. The threat, no matter what it's referred to, may need to be stopped at all points of the computer system infrastructure, including laptop, desktop, server, gateway, network, PDA, mobile phone, and the like. Therefore a need exists for an improved threat management facility applied to the same set of technologies and capabilities for all threats.

Further, software has become so easy to install on computers that it has become very difficult to control what software is running on them or what applications have the ability to run on them. While quick downloads and simple installations of computer applications can make operation of new functionalities in the computer environment easy, new software installations can be problematic. In the corporate environment, IT managers are given the task to maintain security, equipment, and corporate policies and each of these tasks becomes increasingly more difficult as more software applications are loaded on to computer systems within the corporate domain. The corporation may want to control the types of software applications that are run on its network servers, client computers, and other computing facilities within its control. The corporation may also want to control the software applications and their versions for many reasons, such as for corporate policy reasons, legal reasons, user efficiency, network load control, common application usage, application license control, or the like.

Controlling the applications that are running on all of the computing facilities under the control of an IT manager is very difficult and there exists a need to improve this capability.

SUMMARY

In embodiments of the present invention, improved capabilities are described for the operation of a threat management facility, where the threat management facility may provide for a plurality of computer asset protection services to a corporate computer network. The threat management facility may provide a policy management service as one of the plurality of protection services, wherein the policy management service may be adapted to provide corporate policy updates to a plurality of computer facilities associated with the corporate computer network. In addition, the corporate policy updates, and a related corporate policy, may relate to the acceptability of an operation of a computer application.

In embodiments, the threat management facility may provide for the plurality of protection services to a plurality of corporate computer network customers. Updates from the threat management facility may include updates to at least one of a white list of acceptable applications, white list of a group of application types, black list of unacceptable applications, black list of unacceptable application types, and the like. In embodiments, the plurality of services provided by the threat management facility may be a malicious code protection update service, providing a firewall service, and the like.

In embodiments, protected computer facilities may include a desktop computer, a laptop computer, a tablet computer, a handheld computer, a PDA, a mobile phone, a server, a web server, a file server, and the like, that may operate a local version of a policy manager that may be updated by the policy management service. The policy manager may contain a white list of acceptable applications, white list of a group of application types, black list of unacceptable applications, a black list of unacceptable application types for which the computer facility can execute, and the like.

In embodiments, the threat management facility may be a server based threat management facility. The threat management facility may be provided as a third party service in relation to a corporation associated with the corporate computer network. The threat management facility may provide internal policy management tools to a corporation associated with the corporate computer network for making modifications to policies such that the policies regulating the plurality of computer facilities may be updated through the internal policy management tools and the threat management facility. In addition, the corporate policy update may include a list provided by a corporation associated with the corporate computer network of at least one of acceptable and unacceptable applications or group of application types.

In embodiments, the policy management service may automatically categorize applications, where the automatic categorization may be based on an association of an application's behavior as compared with that of applications in the provided category. Automatic categorization may be based on an association of contextual information relating to an application as compared with that of applications in the provided category, an association of contextual information relating to an application as compared with that of applications in the provided category, an association of an application's content as compared with that of applications in the provided category, an association of reputation information relating to an application as compared with that of applications in the provided category, and the like.

In embodiments, the computer program may be a network application, a web application, and the like. In embodiments, the computer application may be an executable computer program on one of the computer facilities. Corporate policy may relate to a user type, wherein the user type is used at least in part to determine what computer applications can be operated. In addition, the threat management facility may provide a user feedback module to facilitate user requested policy modifications.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

Figure 1:
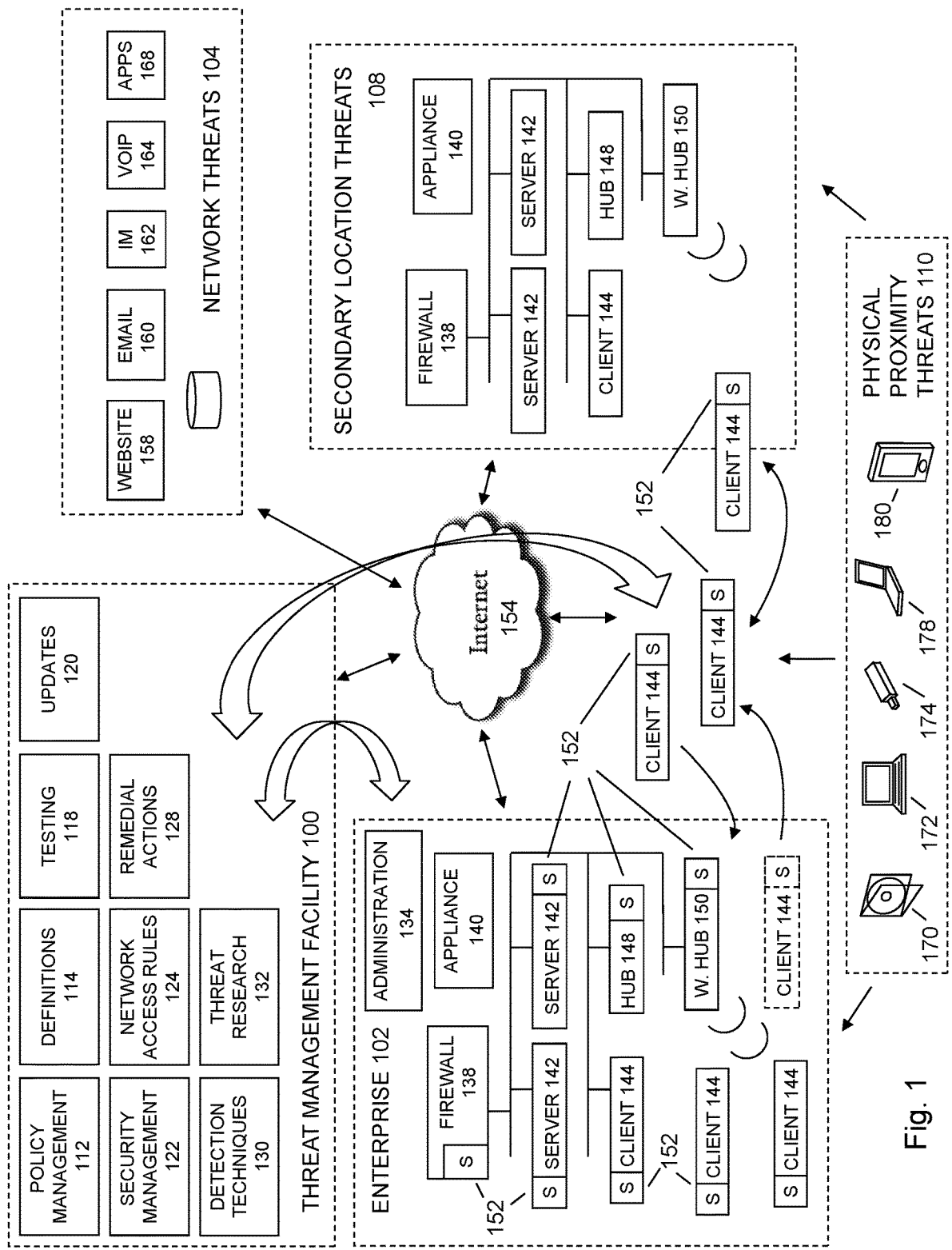
FIG. 1 depicts a block diagram of the threat management facility providing protection to an enterprise against a plurality of threats.

While the invention has been described in connection with certain preferred embodiments, other embodiments would be understood by one of ordinary skill in the art and are encompassed herein.

All documents referenced herein are hereby incorporated by reference.

DETAILED DESCRIPTION

An aspect of the present invention relates to corporate policy management and their implementation through a unified threat management facility 100. As will be explained in more detail below, a threat management facility 100 is used to protect computer assets from many threats, both computer generated threats and user generated threats. The threat management facility 100 is multi-dimensional in that it is designed to protect corporate assets from a variety of threats and it is adapted to learn about threats in one dimension (e.g. worm detection) and apply the knowledge in another dimension (e.g. spam detection). Corporate policy management is one of the dimensions for which the threat management facility can control. The corporation may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services and policy management may be offered as one of the services. We will now turn to a description of the threat management system 100.

Over recent years, malware has become a major problem across the internet 154. From both technical and user perspectives the categorization of a specific threat type, such as whether it is a virus, worm, spam, phishing exploration, spyware, adware, or the like, is becoming reduced in significance. The threat, no matter how it's categorized, may need to be stopped at all points of the enterprise facility 102, including laptop, desktop, server facility 142, gateway, and the like. Similarly, there may be less and less benefit to the user in having different solutions for known and unknown threats. As such, a consolidated threat management facility 100 may need to be applied to the same set of technologies and capabilities for all threats. The threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have lead to a rapid increase in the speed at which threats may move. Today, an unprotected PC connected to the internet 154 may be infected quickly, say within 10 minutes, which may require acceleration for the delivery of threat protection. Where once, monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include enterprise facility 102 client facility's 144 that have moved into network connectivity not directly associated or controlled by the enterprise facility 102. Threats to enterprise facility 102 client facilities 144 may come from a plurality of sources, such as from network threats 104, physical proximity threats 110, secondary location threats 108, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly with the threat management facility 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, control of unauthorized users, control of guest and non-compliant computers, and the like. The security management facility 122 may be a software application that may provide malicious code and malicious application protection to a client facility 144 computing resource. The security management facility 122 may have the ability to scan the client facility 144 files for malicious code, remove or quarantine certain applications and files, prevent certain actions, perform remedial actions and perform other security measures. In embodiments, scanning the client facility 144 may include scanning some or all of the files stored to the client facility 144 on a periodic basis, may scan applications once the application has been requested to execute, may scan files as the files are transmitted to or from the client facility 144, or the like. The scanning of the applications and files may be to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facilities 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide internet use policies, reporting on suspect devices, security and content filtering, active monitoring of network traffic, URL filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running, whereas runtime protection may only interrupt code that has already partly executed; behavioral protection may identify malicious code at the gateway or on the file servers and deletes it before reaching end-point computers; and the like.

In an embodiment, the security management facility 122 may provide for reputation filtering, which may target or identify sources of known malware. For instance, reputation filtering may include lists of URLs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities 144. The updates may be a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities 144, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide policy management facility 112 that may be able to block non-malicious applications, such as VoIP 164, instant messaging 162, peer-to-peer file-sharing, and the like, that may undermine productivity and network performance within the enterprise facility 102. The policy management facility 112 may be a set of rules or policies that may indicate enterprise facility 102 access permissions for the client facility 144, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility 144. The policy management facility 112 may include rules that may be interpreted with respect to an enterprise facility 102 network access request to determine if the request should be allowed. The rules may provide a generic rule for the type of access that may be granted; the rules may be related to the policies of an enterprise facility 102 for access rights for the enterprise facility's 102 client facility 144. For example, there may be a rule that does not permit access to sporting websites. When a website is requested by the client facility 144, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the distribution of enterprise facility 102 wide access rules and policies that may maintain control of the access of client facility 144 to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM 162 activity to only support personnel for communicating with customers. This may allow communication for departments requiring access, but may maintain the network bandwidth for other activities by restricting the use of IM 162 to only the personnel that need access to IM 162 in support of the enterprise facility 102. In an embodiment, the policy management facility 112 may be a standalone application, may be part of the policy management facility 112 network server facility 142, may be part of the enterprise facility 102 network, may be part of the client facility 144, or the like.

In embodiments, the threat management facility 100 may provide configuration management, which may be similar to policy management, but may specifically examine the configuration set of applications, operating systems, hardware, and the like, and managing changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and the update management facility 120 may be provided by the threat management facility 100. enterprise facility 102. In addition, a policy management facility 112 may also require update management (e.g. as provided by the update facility 120 herein described), as the enterprise facility 102 requirements for policies change enterprise facility 102 server facility 142 enterprise facility 102 client facility 144 server facility 142 enterprise facility 102. The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility 144, the enterprise facility 102 network and/or client facility 144 may pull information from the security facility 122 and policy management facility 112 network server facilities 142, there may be a combination of pushing and pulling of information between the security facility 122 and the policy management facility 112 network servers 142, enterprise facility 102 network, and client facilities 144, or the like. For example, the enterprise facility 102 network and/or client facility 144 may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility 144 by providing notification that there are updates available for download and then transmitting the information. The combination of the security management 122 network server facility 142 and security update module may function substantially the same as the policy management facility 112 network server and policy update module by providing information to the enterprise facility 102 network and the client facility 144 in a push or pull method. In an embodiment, the policy management facility 112 and the security facility 122 management update modules may work in concert to provide all the needed information to the enterprise facility's 102 network and/or client facility 144 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The IDE definition files may provide information that may identify malicious code within files, applications, or the like. The definition files may be accessed by security management facility 122 when scanning files or applications within the client facility 144 for the determination of malicious code that may be within the file or application. The definition files may contain a number of commands, definitions, or instructions, to be parsed and acted upon, or the like. In embodiments, the client facility 144 may be updated with new definition files periodically to provide the client facility 144 with the most recent malicious code definitions; the updating may be performed on a set time period, may be updated on demand from the client facility 144, may be updated on demand from the network, may be updated on a received malicious code alert, or the like. In an embodiment, the client facility 144 may request an update to the definition files from an update facility 120 within the network, may request updated definition files from a computing facility external to the network, updated definition files may be provided to the client facility 114 from within the network, definition files may be provided to the client facility 144 from an external computing facility from an external network, or the like.

In an embodiment, a definition management facility 114 may provide for the timely updates of definition files information to the network, client facilities 144, and the like. New and altered malicious code and malicious applications may be continually created and distributed to networks worldwide. The definition files that maintain the definitions of the malicious code and malicious application information for the protection of the networks and client facilities 144 may need continual updating to provide continual defense of the network and client facility 144 from the malicious code and malicious applications. The definition files management may provide for automatic and manual methods of updating the definition files. In embodiments, the network may receive definition files and distribute the definition files to the network client facilities 144, the client facilities 144 may receive the definition files directly, or the network and client facilities 144 may both receive the definition files, or the like. In an embodiment, the definition files may be updated on a fixed periodic basis, on demand by the network and/or the client facility 144, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility 144 having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility 144 application should be granted access to a requested network location. The network location may be on the same network as the facility or may be on another network. In an embodiment, the network access control may verify access rights for client facilities 144 from within the network or may verify access rights of computer facilities from external networks. When network access for a client facility 144 is denied, the network access control may send an information file to the client facility 144, the information file may contain data or commands that may provide instructions for the remedial action facility 128. The information sent by the network access facility 124 control may be a data file. The data file may contain a number of commands, definitions, instructions, or commands to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility 144. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites 158, controlling instant messenger 162 accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the network access rules facility 124. The network access rules facility 124 may be maintained by the network administration facility 134 using the network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules facility 124 management.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility 144 network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility 144, quarantine of the application, terminating the application, isolation of the application, isolation of the client facility 144 to a location within the network that restricts network access, blocking a network access port from a client facility 144, reporting the application to a administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility 144, and the like. This may provide the capability of not allowing a streaming file or portions of the streaming file containing malicious code from entering the client facility 144, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility 144, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility 144 computing facilities on a network. The administration facility 134 may be able to send test files to a set of client facility 144 computing facilities to test the ability of the client facility 144 to determine acceptability of the test file. After the test file has been transmitted, a recording facility may record the actions taken by the client facility 144 in reaction to the test file. The recording facility may aggregate the testing information from the client facility 144 and report the testing information to the administration facility 134. The administration facility 134 may be able to determine the level of preparedness of the client facility 144 computing facilities by the reported information. Remedial action may be taken for any of the client facility 144 computing facilities as determined by the administration facility 134; remedial action may be taken by the administration facility 134 or by the user of the client facility 144.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility 144, server facility 142, administration facility 134, firewall 138, gateway, hubs 148, routers, threat management appliance 140, desktop users, mobile users, and the like. In embodiments, it may be the end-point computer security facility 152, located on a computer's desktop, which may provide threat protection to a user, and associated enterprise facility 102. The end-point computer security facility 152 may be an application loaded onto the computer platform or computer support component, where the application may accommodate the plurality of computer platforms and/or functional requirements of the component. For instance, a client facility 144 computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs 148, routers, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility 144 computing platforms on which the endpoint computer security facility 152 is adapted. A client facility 144 computing platform may be a computer system that is able to access a service on another computer, such as a server facility 142, via a network. This client facility 144 server facility 142 model may apply to a plurality of networked applications, such as a client facility 144 connecting to an enterprise facility 102 application server facility 142, a web browser client facility 144 connecting to a web server facility 142, an e-mail client facility 144 retrieving e-mail from an internet 154 service provider's mail storage servers 142, and the like. In embodiments, traditional large client facility 144 applications may be switched to websites, which may increase the browser's role as a client facility 144. Clients 144 may be classified as a function of the extent to which they perform their own processing. For instance, client facilities 144 are sometimes classified as a fat client facility 144 or thin client facility 144. The fat client facility 144, also known as a thick client facility 144 or rich client facility 144, may be a client facility 144 that performs the bulk of data processing operations itself, and does not necessarily rely on the server facility 142. The fat client facility 144 may be most common in the form of a personal computer, where the personal computer may operate independent of any server facility 142. Programming environments for fat clients 144 may include Curl, Delphi, Droplets, Java, win32, X11, and the like. Thin clients 144 may offer minimal processing capabilities, for instance, the thin client facility 144 may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility 144 may also be a mix of the two, such as processing data locally, but relying on a server facility 142 for data storage. As a result, this hybrid client facility 144 may provide benefits from both the fat client facility 144 type, such as multimedia support and high performance, and the thin client facility 144 type, such as high manageability and flexibility. In embodiments, the threat management facility 100, and associated end-point computer security facility 152, may provide seamless threat protection to the plurality of clients 144, and client facility 144 types, across the enterprise facility 102.

The enterprise facility 102 may include a plurality of server facility 142, such as application servers 142, communications servers 142, file servers 142, database servers 142, proxy servers 142, mail servers 142, fax servers 142, game servers 142, web servers 142, and the like. A server facility 142, which may also be referred to as a server facility 142 application, server facility 142 operating system, server facility 142 computer, or the like, may be an application program or operating system that accepts client facility 144 connections in order to service requests from clients 144. The server facility 142 application may run on the same computer as the client facility 144 using it, or the server facility 142 and the client facility 144 may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs 148, gateways, print servers 142, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility 144 to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the treat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the routers and hubs 148; at the desktop of client facility 144 computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM 162 and VoIP 164; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities 144 within the enterprise facility 102 may be connected to the enterprise facility 102 network by way of wired network facilities 148 or wireless network facilities 150. Client facilities 144 connected to the enterprise facility 102 network via a wired facility 148 or wireless facility 150 may receive similar protection, as both connection types are ultimately connected to the same enterprise facility 102 network, with the same end-point computer security facility 152, and the same threat protected enterprise facility 102 environment. Mobile wireless facility 150 clients 144, because of their ability to connect to any wireless 150 network access point, may connect to the internet 154 outside the enterprise facility 102, and therefore outside the threat-protected environment of the enterprise facility 102. In this instance the mobile client facility 144, if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility 144 that has an embedded end-point computer security facility 152, such as by providing URL filtering in personal routers, using a web appliance as a DNS proxy, or the like. Mobile client facilities 144 that are components of the enterprise facility 102 but temporarily outside connectivity with the enterprise facility 102 network, may be provided with the same threat protection and policy control as client facilities 144 inside the enterprise facility 102. In addition, mobile client facilities 144 may receive the same interactions to and from the threat management facility 100 as client facilities 144 inside the enterprise facility 102, where mobile client facilities 144 may be considered a virtual extension of the enterprise facility 102, receiving all the same services via their embedded end-point computer security facility 152.

Interactions between the threat management facility 100 and the components of the enterprise facility 102, including mobile client facility 144 extensions of the enterprise facility 102, may ultimately be connected through the internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the internet 154 and through to the threat management facility 100. The Internet 154 however, is also the path through which threats may be transmitted from their source. These network threats may include threats from a plurality of sources, including websites 158, e-mail 160, IM 162, VoIP 164, application software, and the like. These threats may attempt to attack a mobile enterprise facility 102 client facility 144 equipped with an end-point computer security facility 152, but in embodiments, as long as the mobile client facility 144 is embedded with an end-point computer security facility 152, as described above, threats may have no better success than if the mobile client facility 144 where inside the enterprise facility 102.

However, if the mobile client facility 144 where to attempt to connect into an unprotected connection point, such as at a secondary location 108 that is not a part of the enterprise facility 102, the mobile client facility 144 may be required to request network interactions through the threat management facility 100, where contacting the threat management facility 100 may be performed prior to any other network action. In embodiments, the client facility's 144 end-point computer security facility 152 may manage actions in unprotected network environments such as when the client facility 144 is in a secondary location 108 or connecting wirelessly 150 to a non-enterprise facility 102 wireless internet 154 connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138, servers 142, clients 144, hubs 148, wireless hubs 150, and the like. As a result, the computer components of the secondary location 108 may be open to threat attacks, and become potential sources of threats, as well as any mobile enterprise facility 102 clients 144 that may be connected to the secondary location's 108 network. In this instance, these computer components may now unknowingly spread a threat to other components connected to the network.

Some threats may not come directly from the Internet 154, such as from non-enterprise facility 102 controlled mobile devices that are physically brought into the enterprise facility 102 and connected to the enterprise facility 102 client facilities 144. The connection may be made from direct connection with the enterprise facility's 102 client facility 144, such as through a USB port, or in physical proximity with the enterprise facility's 102 client facility 144 such that a wireless facility 150 connection can be established, such as through a Bluetooth connection. These physical proximity threats 110 may be another mobile computing device, a portable memory storage device, a mobile communications device, or the like, such as CDs and DVDs 170, memory stick 174, flash drive 174, external hard drive, cell phone 178, PDAs 180, MP3 players, digital cameras, point-to-point devices, or the like. A physical proximity threat 110 may have been previously infiltrated by network threats while connected to an unprotected network connection outside the enterprise facility 102, and when connected to the enterprise facility 102 client facility 144, pose a threat. Because of their mobile nature, physical proximity threats 110 may infiltrate computing resources in any location, such as being physically brought into the enterprise facility 102 site, connected to an enterprise facility 102 client facility 144 while that client facility 144 is mobile, plugged into an unprotected client facility 144 at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Now that the overall system has been described, we turn towards a set of policy management embodiments. It should be understood that the following policy management embodiments may be managed through a threat management facility 100 along with other services, such as those described herein.

Controlling what applications are permitted to execute on a computing platform is difficult due to the fact, at least in part, that applications resident on the computing platform and applications to which the computing platform has access are always changing. A user of such systems may, for example, update resident applications or add new software to their computers by downloading software from a network (e.g. the internet) or through other conventional means (e.g. loading from a DVD, CD, memory drive, portable memory, memory stick, etc.). In addition, users may access applications on the Internet, or other network, and controlling such access can be difficult to stop or control. While there are many times that such users behavior may be acceptable, there are also many times where adding new applications, updating existing applications, or accessing Internet applications can cause problems. A prime example of an area where this can be problematic is in the corporate environment. A corporation may provide computers to its employees but it may want to restrict access to certain computer applications, versions of applications, computer content or the like. Situations such as these are difficult to control because any user can add or access applications that are not permitted by the corporation.

An aspect of the present invention relates to controlling access to software applications on computing systems. A system and method according to the principles of the present invention may include providing computing platforms with a policy facility such that the policy facility controls access to software applications and/or access to provisions used to execute applications. The policy facility may be updated through a policy update server to provide the most current version of the policy. This arrangement may be used to create a user friendly but controlled access environment. The policy facility may update automatically when the computing platform is connected to a network that provides access to the policy update server, it may be updated at predetermined times or it may be updated based on another parameter. By keeping the policy facility updated, the computer may be prevented from accessing certain computer applications, but it should be able to access those applications that the user needs. Another benefit of a system and method according to the principles of the present invention is that, in certain embodiments, many user computing platforms (e.g. desktops, notebooks, palmtops, handhelds and the like) can be delivered updated application access policies efficiently and the updates can be verified much more easily than was ever provided before. An aspect of the present invention relates to identifying and updating policy facilities with software application characteristics, categories, or the like from a policy network server. The policy network server may provide the information and/or updates to other network management systems to control the application execution. In other embodiments, the policy network server provides the information and/or updates to client computing facilities (e.g. desktops, laptops, palmtops, handhelds and the like) directly.

A managed service adapted to maintain policies, rules, analysis databases and application information to be used to control the execution of applications on computing platforms may be provided as a third party vendor service (e.g. external to a corporation), as an enterprise system (e.g. managed internal to a corporation), or otherwise provided.

In an embodiment, the policy manager (as described in more detail elsewhere herein) may be updated from an external source (i.e. managed through a third party security platform provider) and it may also be updated through internal corporate processes. For example, the internal IT manager may be provided with tools used to update the policies on all or some of the corporate computer systems. This arrangement may make it easier for internal personnel to make changes to the policies but it may also allow certain policies to be managed through the third party provider. There may be a reconciliation engine in the policy manager to reconcile any conflict created by the two different sources of updates. There may also be a feedback mechanism such that changes made by the internal personnel are transmitted back to the third party provider such that the third party provider can make the necessary changes to their update database. In addition, the system may be equipped with a user feedback module where the user can request changes to their policy. The policy change request may be transmitted back to an internal and/or external resource for consideration and/or implementation. It should be understood that a third party managed threat management facility 100 may provide its services to a number of different corporate customers and it may have separate update databases for each of such customers.

Another aspect of the present invention relates to the policy facility itself. In embodiments, the policy facility may be configured to compare a selected application(s) to an identified application category, application list, application table, specifically identified application or other such reference to determine if interaction or execution of the selected application permitted. For example, a corporation may set an application interaction policy that restricts access to a category of applications, such as instant messaging applications, gaming applications, imaging applications, video applications or other categories of applications. Once the policy is set, individual computers (e.g. clients) may have their policy facilities updated with the restriction. When a user attempts to run or otherwise interact with an application or when an existing application attempts to run or otherwise interact with another application, the policy facility may be consulted. The policy facility, in certain embodiments, may analyze the application to see if it relates to the restricted category of applications. In other embodiments, the policy facility may determine if there is an association between the application and another form of access control information (e.g. a particular application listing, a list of applications, a table of applications, a database of applications, a category of applications, or the like).

An aspect of the present invention relates to a combination of computer security protection and computer or corporate policy control. In embodiments, the policy facility may detect applications and/or content for threats (e.g. viruses, potentially malicious application, spyware, etc.) as well as for applications that, while they do not necessarily pose threats, are identified as restricted.

Figure 2:
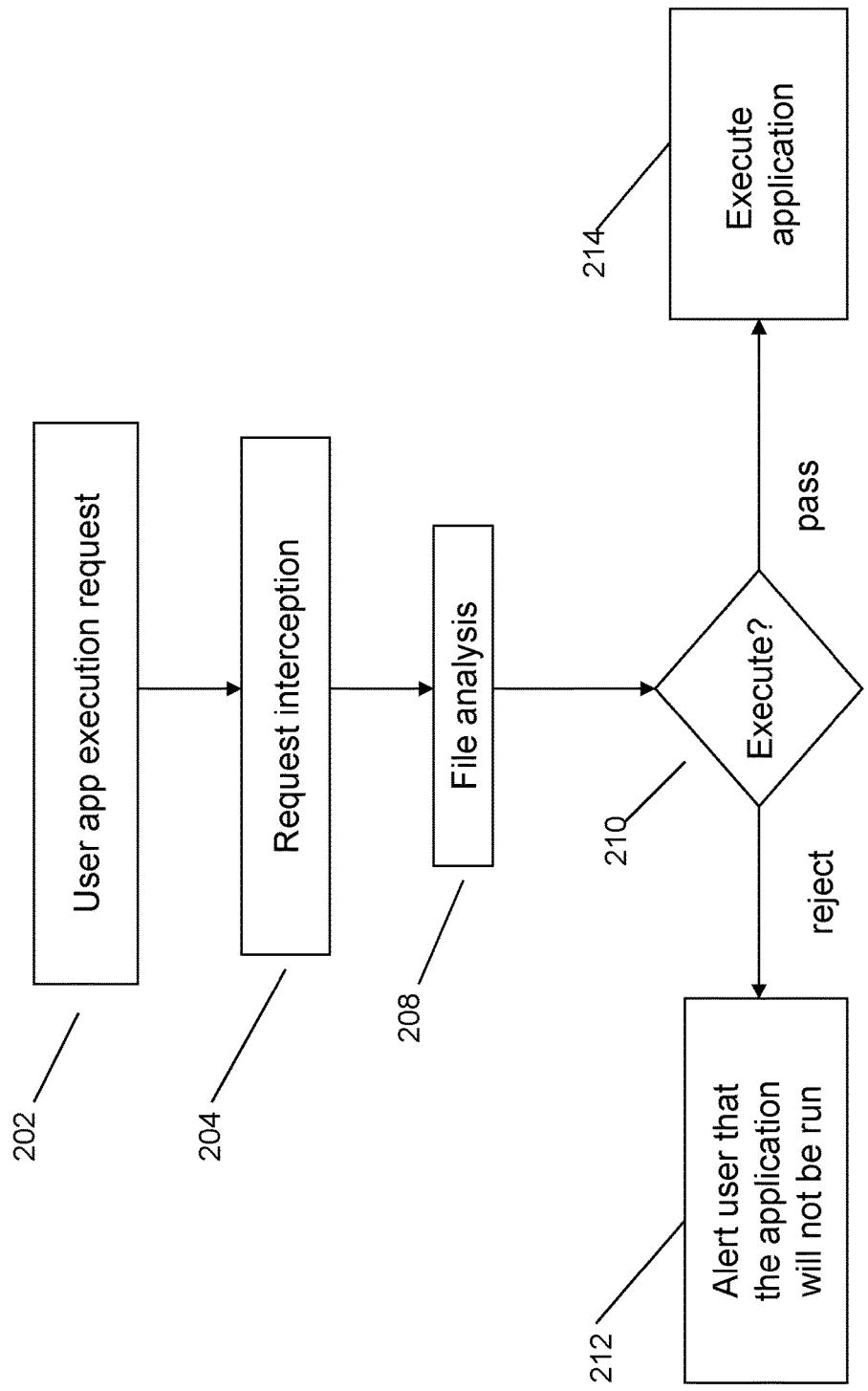
FIG. 2 shows an embodiment of a flow chart showing the process of intercepting an application and determining if the application should be executed.

Referring to FIG. 2, an embodiment of a process flow adapted to determine if an application should be executed on a computing facility is shown. In an embodiment, when a user requests the execution of a software application, the application may be checked against a database to determine if the application should be executed, blocked from execution, or have the execution behavior of the application modified. The database may be provided by a managed service. Additionally, the requested application execution may be checked against policies to determine if the application should be blocked based on the enterprises application policy. The database may include information such as application names, application characteristics, categories of applications, indicia of particular applications, or the like. An analysis facility may access the database to determine if there is a match between the requested application and the provided database. In referring to the flow diagram of FIG. 2, a user of a computer facility may request the execution of an application 202, such as a word processor, game, browser or the like. The application may reside on the user's computer device, on a network server, on a removable storage device, or the like for example. The application execution request 202 may be intercepted 204 by the analysis facility to determine if the application is permitted to execute by comparing information pertaining to the requested application 202 against the provided database that contains an indication of the permitted and/or restricted applications (e.g. a listing of permitted or blocked applications). A file analysis 208 may be performed by comparing information about the requested application 202 to information within the application database. In an embodiment, the analysis facility may intercept the application execution request 204 and perform the comparison of the requested application to the database to identify & classify the application 210. A status indication may be returned to the analysis facility. In an embodiment, the analysis facility may then check the returned status against the enterprise policy file to determine if the application should be blocked based on the policy set by the enterprise. If the file analysis 208 indicates that the application should be blocked, the user may receive notification that the application will not be run 212. If it is determined that the application request is allowed, the application execution may resume 214. In an embodiment, even if the application is executed 214, there may be restrictions placed on the application characteristics or functions. For example, a user may request the execution of a game, the execution may be permitted by the analysis facility, but the game may be restricted to executing on the user's computer device without permitting access any network resources. There are many types of restrictions that may be placed on an application in the event it is permitted to operate. The restrictions may relate to external resource access (e.g. access to network resources), internal functions (e.g. access to particular functions otherwise provided by the application) and the like.

Figure 3:
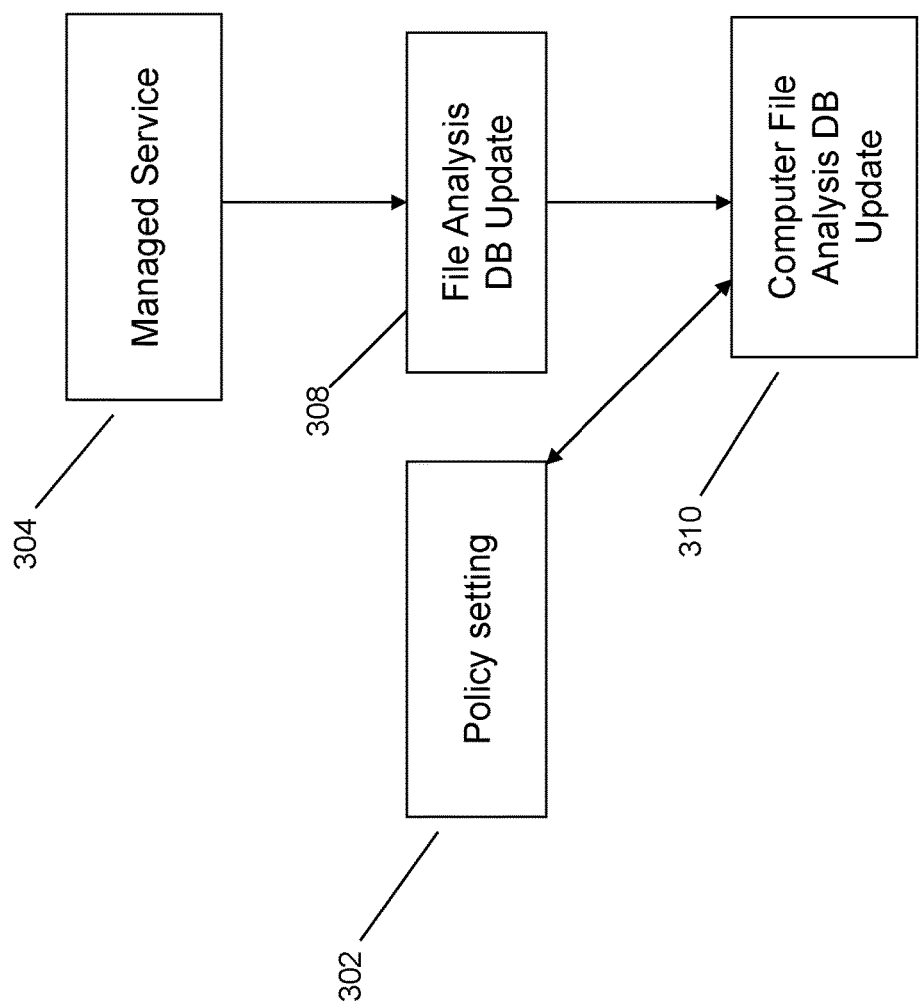
FIG. 3 shows an embodiment of a flow chart showing the process of updating the analysis databases using a managed service.

Referring to FIG. 3, an embodiment of a flow chart describing the development of the application analysis database and providing the database to user computer device is shown. In an embodiment, a managed service 304 may develop and maintain one or more databases of application characteristics. These may define specific files or characteristics may define a complete class of applications, or sets of application behavior. Additionally, the application characteristics may be categorized by application type that may include viruses, worms, adware, games, instant messaging clients, word processors and the like. The database 308 may be a set of files (e.g. data files), which may be delivered to each client computer 310. Each client 310 may have a copy of all or part of the database 308 created by the managed service 304. In an embodiment, the database 308 information may be developed from enterprise announcements of application releases, from searching the Internet for releases of applications, by submissions from customers of the managed service, by submission from the public to the managed service, or the like. The managed service 304 may continually perform the application information gathering and updating the file analysis databases 308 as new applications are determined. In an embodiment, policies 302 may be set by an enterprise to configure the types of software applications it wishes to prevent from operating on user computing facilities. The system administrator may have access to a list of categories and specific applications, for which policy 302 may be set. The administrator may then create a policy 302 of categories and applications that may be restricted. This policy 302 may be stored in a policy file (e.g. a policy data file), which may also be delivered to the client computer. In an embodiment, the policy 302 need not be updated when the file analysis database 308 is updated. The policy 302 may be changed as the enterprise's policy towards different software applications change. The information in the file analysis database 308 may be information such as computer application names, indicia of such applications, application associations and the like. The information in the file analysis database 308 may be set manually by collecting lists of application information to describe the restricted or permitted applications. The information in the database may be set by an automatic process that defines the characteristics of an application. The information in the database may be set through a combination of automatic and manual processes as herein described. After the file analysis database is updated 308, the managed service 304 may make the new computer file analysis database available for customers to download. Depending on the particular corporate policies 302, only certain information from the database may be acted on by the computing facility 310. For example, the policy 302 may restrict all voice over IP applications from operating on corporate computers so information identifying all such applications may be provided by the policy file downloaded to the user's computing facility. Once loaded with this information, the information may be used to block the execution of related applications per the process described in connection with FIG. 2 or as described otherwise herein. In an embodiment, the managed service may be a web service for which the customers have access. The customers may download the updated analysis databases continually at a preset frequency. In an embodiment, the continual downloading of the updated analysis databases may ensure that the customer computers will have the latest available application information. In another embodiment, the customer may be able to download the updated analysis databases manually (e.g. at the customers request) to any one of the clients or network servers.

In embodiments, the analysis database may contain categories of applications that have restrictions. For example, a category may define a class or type of application (e.g. all messaging applications), therefore when any messaging application is requested, the information obtained from the policy analysis database may be used to associate the requested messaging application to the general category and prevent the execution of the application if it matches the category information. In an embodiment, the category may be determined automatically using an algorithm to match the application to a category within the policy analysis database. The algorithm may make the determination if a requested application is part of certain category. In another embodiment, the determination may be manual where a person within the managed service may manually associate applications into categories. Once the application/category affiliations are established it becomes straightforward to identify the applications that need to be restricted based on a corporate policy that identifies specific categories to restrict. For example, if the corporate policy restricts access to all instant messaging applications, the corresponding category can be reviewed in the database and all of the related application identification information (e.g. yahoo IM, AOL IM, MSN IM, etc.) can be downloaded to the user's computing facility for use in a restriction process (e.g. as depicted in FIG. 2)

While many embodiments herein describe methodologies that involve listing applications, or related information, that are restricted in some way, it should be understood that information relating to approved applications may be used in much the same way and this use of information is intended to be encompassed by the present invention. For example, while some embodiments indicate that a list of restricted application information may be downloaded to a user's computing facility to restrict access, it will be obvious to one skilled in the art that information pertaining to acceptable applications may be downloaded to the user's computing facility to control the applications that are permitted to be operated; and these embodiments are encompassed by the present invention.

In an embodiment, the analysis databases may be related to the policy of restricted applications and not to a particular user or group of users. For example, the policy may be set to prevent the execution of a messaging application on a enterprises network. Regardless of the user requesting the execution of the messaging application, the application may be prevented from executing.

In another embodiment, the application execution prevention may be based on hierarchy within the enterprise where users within a certain part of a company may be able to use an application. For example, a support department may be permitted to use messaging applications to setup chat areas with customers but the messaging applications may be blocked for the remainder of the enterprise. Additionally, application execution may be prevented based on the type of connection a computer device may have. For example, a computer device with a direct internal connection (e.g. client computer device) may have a certain set of applications blocked while a virtual private network (VPN) connected computer device from a remote location may have a different set of applications blocked from execution.

In an embodiment, the policy analysis databases may be related to the configuration of the user's computer device. The policy analysis databases may contain information that may permit the execution of applications if a certain configuration exists on the computer device. For example, the application may be permitted to execute if the computer device has virus protection software active. The active virus protection software may need to be of a particular version or the virus definitions are of a certain date. If the proper configuration conditions are not met, the application may be prevented from executed.

As described above, the execution of application may be based on the unwanted network traffic that the application may create. If the application creates unwanted network traffic that may use up part of the network bandwidth, and therefore interfere with other network applications, the application may be prevented from execution. For example, Voice over IP applications may require a significant amount of a network's bandwidth and the policy analysis database may provide information to prevent the Voice over IP application from executing.

Additionally, the application may be prevented from executing an application to increase the security of the network. The enterprise may have developed email rules to exclude certain types of attachments from being sent from or received at the enterprise email accounts, but users may receive the same excluded attachments with a messaging application. The policy analysis databases may prevent the execution of the messaging application to prevent the excluded files from entering or leaving the network through the messaging application.

In an embodiment, the application execution may not be blocked, but may be executed with restrictions. Those restrictions may be enforced by another security module, such as a firewall. For example, the messaging application may be permitted to execute, but the sending and receiving of files may be blocked and therefore preventing unwanted files from being sent or received using the messaging application.

Figure 4:
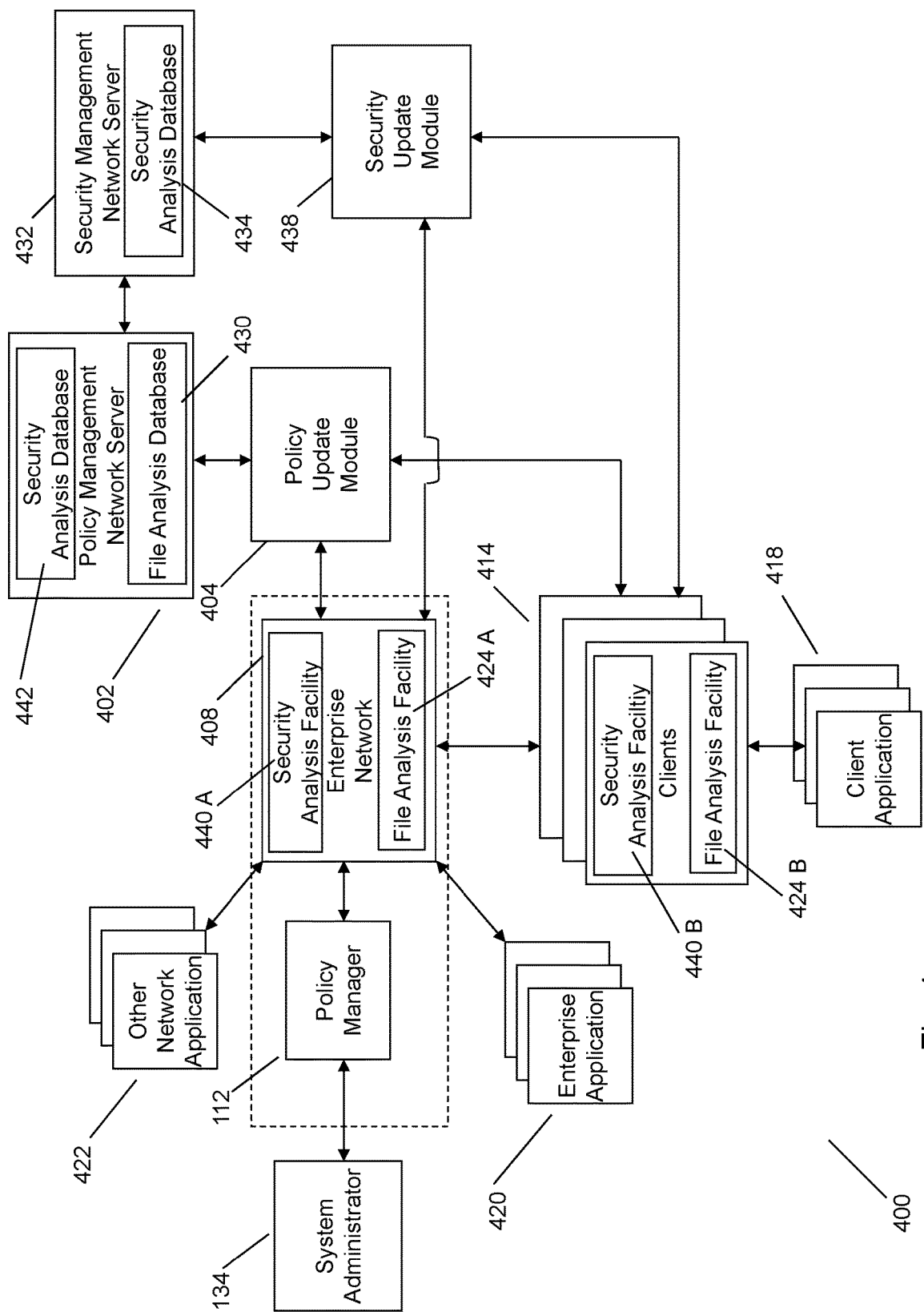
FIG. 4 shows a block diagram of the associations between the various components of the invention.

FIG. 4 illustrates an application execution policy platform 400 according to the principles of the present invention. The platform 400 may include a policy management network server 402 that handles information relating to file analysis database 430 and security analysis database 442. The policy management network server 402 may have a user interface that permits a user to store, remove or otherwise update policies relating to file management and security management. The policy management network server 402 may provide information relating to application management or security management to a policy update module 404. The policy update module 404 may be adapted to periodically, or otherwise, update various computer facilities with the application management and security information. For example, the policy update module may be adapted to update at least one enterprise network 408 and/or client 414 device that may be associated with the enterprise network 408.

In a similar manner, a security management network server 432 may handle information related to a security analysis 434 database; the security analysis database 434 may be substantially the same as the security analysis database 442 in the policy management network server 402. In an embodiment, the security management network server 432 may provide the security analysis database 434 to the policy management network server 402, may supplement the policy management network server 430, or may provide security database information instead of the policy management network server 402. The security management network server may be a third party server for providing security information to the policy management network server 402, the enterprise network 408, and/or clients 414. The security management network server 432 may provide information relating to security management or security management to a security update module 404 that may be adapted to provide the security information to at least one enterprise network 408 or clients 414 that may be associated with the enterprise network.

Analysis facilities (e.g. security analysis facility 440A and file analysis facility 424A) within the enterprise network 408 may access the received file analysis and security databases to control the execution of applications within the enterprise network 408. The analysis facilities may also access enterprise policy information that may be provided by a polity manager 112. A system administrator 134 of the enterprise network 408 may determine enterprise application policies that may be in addition or modify the file and security databases stored in the enterprise network. The policy manager 112 may have an interface that permits the system administrator 134 to view and modify the file and security databases of the enterprise network 408.

When an application execution is requested on the enterprise network 308, the security and file analysis facilities may intercept the execution request and apply the combined file/security database information and policy information to determine if the application should be permitted to execute. The analysis facilities may analyze characteristics of the application code and match these characteristics with characteristics and categories within the file and security databases. The analysis facilities may be able to control the application execution for any application associated with the enterprise network 408 such as an enterprise application 420, another network application 422, or a client application 418.

The client 414 computer devices that may be associated with the enterprise network 408 may have the same, or substantially the same, security and file analysis facilities and databases that reside on the enterprise network 408. For client 414 executed applications, the file and security analysis facilities may act in a similar manner as the enterprise network 408 file and security analysis facilities. If a user attempts to execute an application from a client 414 computer (e.g. client application 418, enterprise application 420, or other network application 422), the client 414 analysis facilities may perform the application analysis instead of the enterprise network analysis facilities to determine if the application should be executed. The client 414 analysis databases may be updated by the enterprise network 308 or the update modules 404 and 438. The clients 414 may receive analysis database updates directly from the update modules 404 and 438 based on update rules established and communicated from the enterprise network. Additionally, the enterprise network 408 may provide the clients 414 with the policy information that was established by the policy manager 112.

Continuing to refer to FIG. 4, a system or method according to the present invention may include a policy management network server 402. The policy management network server 402 may store and maintain at least one file analysis database 430 that may include information used to control the execution of applications. The file analysis database 430 may include information that relates to the characteristics of the application, a categorization of applications, names of applications, or other information indicative of an application or application type. The policy management network server 402 may also store and maintain at least one security analysis database that may include characteristics of potentially malicious application (e.g. virus definitions, spam definitions, adware definitions, information relating to such content), categorization of potentially malicious application, or the like for the control of potentially malicious application execution on a computer device.

The policy management network server 402 may also receive information from a security management network server 432 that may provide additional potentially malicious application information, to the policy management network server 402. In embodiments, the security management network server 432 provides all or substantially all of such information to the policy management network server 402.

In an embodiment, the policy management network server 402 may provide the application characteristics, categorization, and the like for all types of applications to be controlled on computing facilities, computer networks, clients, or the like. In an embodiment, the policy management network server 402 may work in coordination with the security management network server 432 to provide all the necessary application characteristics, categorizations, or the like that are to be controlled. In an embodiment, the security analysis database 442 of the policy management network server 402 may be the same as the security analysis database 434 of the security management network server 432. In an embodiment, the security analysis database 442 of the policy management network server 402 may be different than the security analysis database 434 of the security management network server 432.

A policy update module 404 may provide the update coordination of the policy management network server 402 information to an enterprise network 408. Additionally, the policy update module 404 may provide update coordination directly between a client 414 and the policy management network server 402. The policy update module 404 may provide updating to both the enterprise network 408 and the clients 414.

In an embodiment, the policy update module 404 may be a stand alone application, may be part of the policy management network server 402, may be part of the enterprise network 408, may be part of the clients 414, or the like.

In an embodiment, the policy update module 404 may push information to the enterprise network 408 and/or clients 414, the enterprise network 408 and/or clients 414 may pull information from the policy management network server 402, there may be a combination of pushing and pulling of information between the policy management network server 402, enterprise network 408, and clients 414, or the like. For example, the enterprise network 408 and/or clients 414 may pull information from the policy management network server 402 may requesting the information using the policy update module 404; the request may be based on a certain time period, by a certain time, by a date, on demand, or the like. In another example, the policy management network server may push the information to the enterprise network 408 and/or clients 414 by providing notification that there are updates available for download and then transmitting the information.

In an embodiment, the combination of the security management network server 432 and security update module 438 may function substantially the same as the policy management network server 402 and policy update module 404 by providing information to the enterprise network 408 and the clients 414 in a push or pull method. In an embodiment, the security update module 438 may be part of the security management network server 432, enterprise network 408, clients 414, or the like.

In an embodiment, the policy update module 404 and the security update module 438 may work in concert to provide all the needed information to the enterprise network 408 and/or clients 414 for control of application execution. In an embodiment, the policy update module 404 and security update module 438 may be combined into a single update module.

In an embodiment, the enterprise network 408 may receive information from the policy management network server 402 and/or the security management network server 432 to provide definition of applications to be controlled. The received policy and security information may be in the form of a database, a relational database, a table, an XML file, an ASCII file, a flat file, an SQL database, or other data file. The policy and security information that may be downloaded from the policy management network server 402 and security management network server 432 may be used as received, may be modified, may be reconfigured, or the like by the enterprise network 308 for use in controlling the execution of applications.

In an embodiment, there may be analysis facilities that may access the policy and security information to analyze application execution request. There may be a file analysis facility 424A that may access the provided file analysis database 430 to determine if a requested application should execute (e.g. through a process as described in connection with FIG. 2 and otherwise herein). There may be a security analysis facility 440A that may access the provided security analysis database 442 to determine if an application is malware and if the application execution should be blocked.

In an embodiment, the enterprise network 408 may only provide storage for the policy and security databases and the file and security analysis facilities may access the stored databases to analyze the requested application execution.

Additionally, the file analysis database 430 and security analysis database 442 stored on the enterprise network 408 may be configured for the purposes of the particular enterprise network 408. A system administrator 134 may use a policy manager 112 to create rules, configurations, modifications, or the like of the file and security databases to meet the requirements of a particular enterprise. For example, the file analysis database 430 may have characteristics and categories of all the versions of a word processing application and the enterprise may permit the use of one particular version of the word processing application. The system administrator 134 may use the policy manager 112 to indicate the particular version may be allowed or indicate the particular versions may not be allowed to execute. In an embodiment, the system administrator 134 may use the policy manager to create and maintain a policy database that may be used with the file analysis database 430 and security analysis database 442. The analysis facilities may combine the information in the policy manager 112 files with the analysis databases to create the enterprise's policy of executable applications. In another embodiment, the policy manager 112 may be used to directly modify or reconfigure the file analysis database 430 and security analysis database 442 to meet the policies of the particular enterprise.

In an embodiment, the policy manager 112 may be a stand-alone application or may be part of the enterprise network 408 as indicated by the dotted box.

In an embodiment, the file analysis facility 424A and security analysis facility 440A may determine if an enterprise application 420, other network application 422, or other enterprise network 408 controlled application should be executed (e.g. through a process as described in connection with FIG. 2 and otherwise herein).

An example of the file analysis facility 424A, and in a similar manner the security analysis facility 440A, determining if a file should be executed may include the following method. There may be an analysis of a computer file or other file sample. The file may be filtered and unpacked if necessary. A checksum test may be preformed. Properties may be extracted from the file and a sequence may be generated from the file. Sequencing technology or genotype technology may disassemble the binary executable file to recreate functional blocks of the application code. These functional blocks may include sequence of application program interface (API) calls, string references, and the like which may illustrate the function and execution flow of the program. Identification of functional blocks may provide a high level view of the functionality of a file regardless of binary compilation of the application. Different types of functionality (classified as genes, for example) may be extracted from the sequenced blocks. Genes may be defined using a genotype language. Each gene may describe a different behavior or characteristic of the file. The genes may be matched against the sequence data to identify which genes may be present within the file. The file may then be categorized. Genes or characteristics may be grouped into phenotypes. Phenotypes may represent a certain class of application. The phenotype descriptions may be matched against the gene combinations extracted from the file. An output may be generated. For example, the most significant phenotype may be reported. Alternatively and/or in addition, all identified phenotypes, genotypes and classifications may be reported. Reporting may include generating and/or editing a log file, printing an output, emailing an output, generating an audible output, generating a visual output, facsimile transmission of an output, electronic storage of an output, or the like. In addition to reporting, an output may include stopping the executing of the application.

Using this method, different versions of applications may be determined, entire classes of applications may be determined, or the like. This analysis method may be able to determine the difference between different versions of an application and therefore may provide the system administrator with the ability of blocking the execution of certain versions of an application. This method may also be able to identify a general category of application and block all the different versions of the application type from executing. For example, the file analysis facility 324A may be able to block the execution of all messaging applications based on the application characteristics. Therefore, application lists are not required to block the execution of the application, the characteristics are determined and then compared to the analysis databases to determine if the application may be allowed to execute. This may provide a level of control to the system administrator 134 by not having to know every different executable application name to block all of a type of application. For example, the system administrator 134 may be able to block all messaging applications without knowing all the different application executable names. The characteristics of the messaging application may be determined and compared to the characteristics of a messaging category within the analysis databases to block an entire class of application. The blocking of entire class of application also may stop users from installing unauthorized applications for use on a particular client 414. If the characteristics of the unauthorized application matches one of the blocked categories, the unauthorized application may be blocked.

In an embodiment, the file analysis facility 424A and security analysis facility 440A may use the analysis database files that have been received from the policy manager network server 402 and security management network server 432 or the analysis facilities may use database files that have been modified upon by the policy manager 112. In another embodiment, there may be analysis databases and policy manager 112 databases that the analysis facilities may use in combination to determine if an application should execute.

In an embodiment, there may be a plurality of clients 414 that are connected to the enterprise network 408. The clients may be able to access applications through the enterprise network 408 such as other network applications 422, enterprise applications 420, as well as client applications 418 that may stored on the client 414 computer devices. The other network applications 422 may include applications on the Internet, intranet applications, LAN applications, WAN applications, peer-to-peer applications, or the like. In an embodiment, applications that the client 414 may require the enterprise network to execute may access the enterprise network 408 file analysis facility 424A and security analysis facility 440A to determine if an application should execute. In an embodiment, client applications 418 may use client stored file analysis facility 424B and security analysis facility 440B to determine if an application should be executed.

In an embodiment, the client 414 file analysis facility 424B and security analysis facility 440B may be substantially the same as the enterprise network 408 file analysis facility 424A and security analysis facility 440A. In an embodiment, the enterprise network 408 may transmit a copy of the file analysis facility 424A, security analysis facility 440A, and all associated analysis databases to the clients 444 on the network. In an embodiment, the clients 414 may also receive a copy of the policy manager 112 files that may modify the analysis databases for the particular enterprise.

In an embodiment, in a similar manner as the enterprise network 408 described previously, the client 414 may receive or request analysis database updates from the policy update module 404, security update module 438, or the like. In another embodiment, the client 414 may receive the updated analysis databases from the enterprise network 414 after the enterprise network has received updated files from the policy update monitor 404 and security update monitor 438.

In an embodiment, communication between the client 414 and the update modules may be determined by an update rule provided by the enterprise network 408; the rules may be developed by the system administrator 134 using the policy manager 112. For example, the enterprise network 408 may provide a rule for the client 414 to check for analysis databases at certain time periods. As part of the client updating process, the client may report to the enterprise network that a new update has been installed; the report information may include the install date, version number, version date, client identification, and the like. This may provide a method for the system administrator to verify that the clients 414 are updated to the most recent versions of the analysis databases.

In an embodiment, after the client 414 has received an updated analysis database, the client 414 may apply the policy information provided by the policy manager 112 to configure the analysis databases to the enterprise policies and procedures for executing applications.

In an embodiment, the client 414 may receive analysis file updates from a staging server within the enterprise network 408 or may directly from the managed service 304. Additionally the system administrator 134 may provide enterprise policy rules to the staging server and the individual clients 418 may pull the updated analysis databases and policy rules from the staging server.

While embodiments have been described where various functionalities are performed in various functional blocks, one skilled in the art would appreciate that the various functionalities may be embodied in a single facility or multiple facilities and all such variations are encompassed by the present invention. For example the enterprise network security analysis facility 440A may be combined with the file analysis facility 424A into a single facility or multiple analysis facilities. In the same manner, the client security analysis facility 440B may be combined with the file analysis facility 424B into a single analysis facility or they may be separate. The security analysis database 442 and file analysis database 430 may be combined into a single database on the policy management server 402, enterprise network 402, and clients 414, or they may be provided separately. Additionally, the policy management network server 402 and security management network server 432 along with the policy update module 404 and security update module 438 may be combined into single servers and modules or separated as needed.

In an embodiment, the policy management network server 402 may be any type of network server for storing, distributing, updating, or performing other such processes on the file analysis databases 430, security analysis databases 442, or other related facilities. In an embodiment, the policy management network server 402 may be any type of server including an enterprise network server, web server, file server, or other server type that operates on a LAN, WAN, Internet, intranet, or the like.

In an embodiment, the policy management network server 402 may include policy management tools, user interfaces, file analysis databases 430, security analysis databases 442, management of upload and download of files, enterprise network 408 and client 414 identification services, or the like. In an embodiment, the management tools and interfaces may allow a server owner to manage the file analysis databases 430, manage the security analysis databases 442, set distribution of the analysis databases, and the like. For example, the service owner may modify the file analysis database 430 to include new categories, change categories, delete categories, or the like and then determine when the new file analysis database 430 may be available for distribution. In an embodiment, the policy management network server 402 may notify enterprise networks 408 and clients 414 of an available file analysis database 430, may wait for the enterprise networks 408 and clients 414 to request the file analysis database, or the like.

In an embodiment, the file analysis database 430 may be any type of repository that stores information in a retrievable format (e.g. a relational database, flat file, SQL database, XML, file, ASCII file, table, or the like). In an embodiment, the file analysis database 330 may contain information relating to software applications that are intended to be controlled on another computing facility (e.g. the enterprise network 308, client 314, or the like). In an embodiment, the software application information may include indicia of the application, characteristics of the application, categorization of applications, application names, application execution names, lower level code that identifies the application, or other such information relating to the identification of a particular piece of software, its version, category or other characterization. The category may represent a certain class of software (e.g. word processing software, database software, communication software, instant messaging software, email software, sms software, spreadsheet software, gaming software, image software, video software, multimedia software, presentation software, device driver, software, device application software, browser software, financial software, etc.). The categorization relate to a combination of genes used to describe or identify a class of software program for example.

In an embodiment, the security analysis database 442 may be any type of repository that stores information in a retrievable format (e.g. a relational database, flat file, SQL database, XML, file, ASCII file, table, or the like.) In an embodiment, the security analysis database 342 may contain information on potentially malicious applications and/or content (e.g. virus information, spyware information, spam information, phishing information, etc.). This information may be used to protect associated computing facilities (e.g. enterprise network 408, client 414, or the like). In an embodiment, the potentially malicious application information may include characteristics of an application, categorization of applications, potentially malicious application names, potentially malicious application execution names, potentially malicious application definitions or the like. The categorization may represent a certain class of potentially malicious application software. The categorization may be a combination of genes used to describe or identify a class of software program.

The security management network server 432 may be any type of network server for storing, distributing, updating, or otherwise processing information related to the of security analysis databases 434. In an embodiment, the security management network server 432 may be any type of server that may include a enterprise network server, web server, file server, or similar device adapted to operate on a network, LAN, WAN, Internet, intranet, or the like.

In an embodiment, the server management network server 432 may include policy management tools, user interfaces, security analysis databases 434, a management facility for the management of upload and download of files, enterprise network 408, client 414 identification services, and/or other such facilities. In an embodiment, the management tools and interfaces may allow a server owner to manage the security analysis databases 434, set distribution of the security analysis databases 430, and the like. For example, the server owner may modify the security analysis database 434 to include new categories, change categories, delete categories, or the like and then determine when the new security analysis database 434 may be available for distribution. In an embodiment, the security management network server 432 may notify enterprise networks 408 and/or clients 414 of an available security analysis database 434, it may wait for the enterprise networks 408 and/or clients 414 to request the file analysis database, or perform another similar process.

In an embodiment, the security analysis database 434 may be any type of repository for the storage of information in a retrievable format (e.g. a relational database, flat file, SQL database, XML file, ASCII file, table, or the like). In an embodiment, the security analysis database 334 may contain information on potentially malicious applications that may be controlled at a related computing facility (e.g. at the enterprise network 408, client 414, or the like). In an embodiment, the potentially malicious application information may include characteristics of an application, categorization of applications, potentially malicious application names, potentially malicious application execution names, potentially malicious application definitions or the like. The categorization may represent a certain class of potentially malicious software. The categorization may be a combination of genes used to describe or identify a class of software program.

In an embodiment, the policy update module 404 may manage the transmission of the file analysis database 430 and security analysis database 442 between the policy management network server 402, enterprise network 408, and clients 414. In an embodiment, the policy update module 404 may be incorporated into the policy management network server 402, the enterprise network 408, clients 414, or the like. In one embodiment, the policy update module 404 may determine when an analysis database has been updated and may indicate to the enterprise network 408 and/or clients 414 that there may be updates available.

In another embodiment, the policy update module 404 may receive a request from the enterprise network 408 and/or clients 414 to determine if there may be updated analysis databases. The policy update module 404 may communicate with the policy management network server 402 to determine if there are updates available. If there are updates, the policy update module 404 may retrieve the updates from the policy management network server 402 and transmit them to the requesting device (e.g. enterprise network 408 or client 414).

In an embodiment, the security update module 438 may manage the transmission of the security analysis database 434 between the security management network server 402, enterprise network 408, and clients 414. In an embodiment, the security update module 438 may be incorporated into the security management network server 432, the enterprise network 408, clients 414, or the like. In one embodiment, the security update module 438 may determine when an analysis database has been updated and may indicate to the enterprise network 408 and/or clients 414 that there may be updates available.

In another embodiment, the security update module 438 may receive a request from the enterprise network 408 and/or clients 414 to determine if there may be updated security analysis databases 434. The security update module 438 may communicate with the security management network server 432 to determine if there are updates available. If there are updates, the security update module 438 may retrieve the updates from the security management network server 432 and transmit them to the requesting device (e.g. enterprise network 408 or client 414).

The enterprise network 408 may be any type of network for providing network services to clients 414 or other enterprise network 408 connected computer devices. In an embodiment, the enterprise network 408 may be any type of network that may include an enterprise network server, a web server, a file server, a router, a gateways, or the like that may operate on a LAN, WAN, Internet, intranet, or the like.

In an embodiment, enterprise network 408 may include policy management tools, user interfaces, databases, security systems, management of upload and download of files, client 414 identification services, or the like. In an embodiment, the management tools and interfaces may allow a network administrator 134 to manage the manner in which the network interacts with other computer devices within the enterprise network 408 and remote to the enterprise network 408.

The following example shows an embodiment of preventing potentially malicious applications from executing using application characteristics. It should be understood that the same method may be used to prevent the execution of any application. Additionally, the following methods may be performed on both a network server or on a client computer device. In an embodiment, the enterprise network 408 may include the security analysis facility 440A that may use the security analysis database 442 to detect and prevent the execution of potentially malicious applications. The security analysis facility 440A may perform a number of steps within a method for determining if an application is a potentially malicious application; the steps may include the following. A first step may be analysis of a computer file or other sample to be check is commenced. At step two the file may be filtered. For example, one or more files may be screened for efficiency reasons. If a file is packed, for example, a potentially malicious application detection system may spend more time checking the file. If a file passes a checksum test, for example, the potentially malicious application detection system may not further examine the file.

In a third step, properties may be extracted from the file. In certain embodiments, the file is unpacked if necessary. For example, potentially malicious application may be obfuscated using run-time packers, which render static analysis of code difficult. A variety of run-time packers may use many levels of encryption and/or a variety of compression algorithms. Unpacking technology may use a dynamic language to unpack the file into a state where the file and its contents can be sequenced. Then, a sequence is generated from the file. Sequencing technology or genotype technology may disassemble the binary executable file to recreate functional blocks of the potentially malicious application code. These functional blocks may include sequences of application program interface (API) calls, string references, etc., which illustrate the function and execution flow of the program. While various instances of potentially malicious applications may use common code and similar techniques, the resulting compiled bytes can look very different. Changing the compiler or compiler options can produce a completely different binary file. Identification of functional blocks may provide a high level view of the functionality of a file regardless of binary compilation.

Different types of functionality (classified as genes, for example) may be extracted from the sequenced blocks. Genes may be defined using a genotype language, for example. Each gene may describe a different behavior or characteristic of potentially malicious applications or other file. For example, potentially malicious applications may copy itself to a % SYSTEM % directory. Therefore, a gene may be created to identify this functionality by matching the sequence of API calls and the strings that are referenced.

Genes may be matched against the sequence data to identify genes present in the file. For example, a file may include the following genes:
AGOBO-VU.PEE
UPX—UPX layer
Morphine-B—Morphine layer
NoComp—No company information
Shtdwn—Shutdown functionality
SockSend—Socket based activity
RunKey—Sets a run key
Exec—Executes other programs
Priv—Changes privileges
CopySys—Copies itself to the system directory
AVList—Contains a list of AV products
EnumProc—Enumerates processes
WrProc—Writes to other processes
Listen—Listens on a port
RmThread—Creates remote threads
IRC—IRC references
Host—References the hosts file
CreateSery—Creates a service
StartSery—Starts up a service
EnumTerm—Enumerates and terminates processes
WebList—Contains a list of web addresses In the forth step, the file may be classified. Genes or characteristics may be grouped into phenotypes. Phenotypes may represent a certain class of threat. The class type may range from suspicious to specific (such as Banking Trojan, IRC Bot, etc.). Phenotype descriptions may be matched against the gene combinations extracted from the file. For example, a phenotype to match an IRC Bot potentially malicious file (a set of scripts or an independent program that connects to an Internet Relay Chat (IRC) and may perform automated functions) may include the following genes:
SockSend—Socket based activity RunKey—Sets a run key
Exec—Executes other programs
CopySys—Copies itself to the system directory
AVList—Contains a list of AV products
IRC—IRC references
Host—References the hosts file In a fifth step, an output may be generated. For example, the most significant phenotype may be reported. Alternatively and/or in addition, all identified phenotypes, genotypes and/or threat classifications may be reported. Reporting may include generating and/or editing a log file, printing an output, emailing an output, generating an audible output, generating a visual output, facsimile transmission of an output, electronic storage of an output, or the like. In addition to reporting, an output may include disinfection, deletion, and/or quarantine of the file and/or related files, for example.

In an example of this method in operation, files may be routed or identified to the security analysis facility 440A. As files enter the security analysis facility 440A, the files are checked to see if the files are recognized as being 'packed'. This 'packed' recognition uses similar techniques to virus detection, for example, where certain bytes at a program entry point and/or other properties are evaluated to see if there is a match with a known packer. If the file is packed, the security analysis facility 440A may use unpacking identities to reconstruct the file into an 'unpacked' state. For example, if a file is determined to be packed using a certain packing scheme or program, a corresponding unpacking identity or identities may be used to reconstruct the file in an unpacked (e.g., unencoded, unencrypted, unwrapped and/or decompressed) state.

For example, the unpacking process may decrypt and decompress applicable host data in the file. Then, back imports, resources and entry point may be fixed for the unpacked file. File table(s) may be modified to cause the unpacked file to appear valid.

Once the file is unpacked, core functionality and various characteristics/properties of the program may be examined. In certain embodiments, as discussed above, not all files reach the examination stage, since various initial checks can be used to determine if it is worth spending extra time to analyze the file (e.g., checksums, etc.). At a basic level, certain functionality can be determined to a reasonable degree of confidence from file imports (such as network functionality, process injection, etc.), and other useful information can be obtained from various other properties (such as various portable executable (PE) tables, internal resources, etc.). To gain a higher degree of confidence however, the file may be 'sequenced' to look at the various 'blocks' or groupings of functionality in context.

Sequencing involves tracing through the file and identifying 'blocks' of functionality (a block roughly translates to a function/procedure in the source code, for example). When sequencing is complete, a list of blocks may be available to be examined. Blocks contain a combination of API calls and strings that are referenced within the block. Programs can have very few or very many blocks depending on their functionality.

Gene identities typically contain one specific identifying characteristic (for example, the ability to download a file from a predetermined URL). These genes are matched against the list of sequence blocks (if appropriate to do so) from the file and/or against another type of characteristic. If a gene is triggered (i.e., matched), the gene is placed into a list. In certain embodiments, all available genes are examined to see if there is a match.

Once genes have been identified, the next stage may be to try and match the list of genes against phenotype identities. Similar to how genes are matched against sequence blocks, phenotypes are matched against the list of generated genes. The phenotype identity defines if a particular combination of genes suggests that the file should be reported as suspicious or malicious, for example.

For example, suppose a file is analyzed which contains a virus, such as the W32/Agobot-XJ virus. The file may be analyzed and the unpacking identity recognizes that the file is packed with Morphine, a packer program which encrypts and wraps a file to make identification difficult. The file is unpacked using unpacking identities and the 'Packed' gene, the 'Morphine' gene and the 'Malicious packer' gene are set for the file.

After unpacking, the unpacked file may be rechecked and may be found to be packed with UPX, a compression packer for executable files. The file is again unpacked using unpacking identities. The 'Packed' gene may be set and the 'UPX' gene may be set. Note that UPX may not be classified as 'Malicious' because UPX software has legitimate uses for file compression. Morphine, however, is classified as 'Malicious' because it is intended to encrypt a file and make the file difficult to identify.

Next, the file may be sequenced, and a list of functional blocks representing source code and execution flow in the file may be constructed. Gene identities may be matched against the extracted functional block and relational data. As an example, the series of functions 'GetSystemDirectoryA, GetModuleHandleA, GetModuleFileNameA, CopyFileA' equates to the 'CopySys' gene, wherein a file copies itself to a system directory. Genes identified in or matched against functionality in the file include, for example:

Gene: WrCdSec
Gene: Packed
Gene: OthrExSec
Gene: MultExSec
Gene: EpNotFrSec
Gene: DodgyPk
Gene: Exec
Gene: GenSock
Gene: SendRecv
Gene: ShellExt
Gene: RunKeyDLL
Gene: RunKey
Gene: OffAddin
Gene: IntGetCon
Gene: DnsQu
Gene: shtdwn
Gene: Priv
Gene: CreateSery
Gene: StartSery
Gene: WebList
Gene: AVList
Gene: EnumTerm
Gene: EnumProc
Gene: RandWeb
Gene: http
Gene: CopySys
Gene: CreateSys
Gene: Mime
Gene: IPC
Gene: IRC
Gene: SockSend
Gene: Host
Gene: SerCtlHan
Gene: LETwoSecs Pack: Morphine-B
Pack: UPX These combinations of genes may be matched against phenotype identities. In this exemplary case, the gene combinations match a 'IRC bot' phenotype because the file has the following genes:

Gene: RunKey
Gene: IntGetCon
Gene: DnsQu
Gene: shtdwn
Gene: Priv
Gene: CreateSery
Gene: StartSery
Gene: AVList
Gene: EnumTerm
Gene: EnumProc
Gene: http
Gene: CopySys
Gene: CreateSys
Gene: Mime
Gene: IRC
Gene: SockSend
Gene: Host
Gene: SerCtlHan Since this particular phenotype is of type Malicious, the file may be blocked by the on-access scanner and/or other scanner. The file may be deleted, disinfected or quarantined depending on user configuration.

In an embodiment, the policy manager 112 may be an application that provides an interface to the enterprise network 408 system administrator 134 for the development of enterprise policy databases for the control of application execution. In an embodiment, the policy manager 112 may be a stand-alone application or may be included in the enterprise network 408. The policy manager 112 may include a graphic user interface (GUI), database manager, file browser, or the like to allow the system administrator 134 capability of creating policy files on the enterprise network. In an embodiment, the system administrator 134 may use the policy manager to directly configure the file analysis database 430 and security analysis database 442 that may be resident on the enterprise network 408.

In an embodiment, the system administrator 134 may be any person that is responsible for the operation, maintenance, or the like of an enterprise computer device network.

In an embodiment, the other network applications 422 may be any application that is on a network remote to the enterprise network 308. In an embodiment, the remote network may be an Internet, an intranet, a LAN, a WAN, a peer-to-peer network, or the like.

In an embodiment, the enterprise applications 420 may be any application that is on the enterprise network 408. In an embodiment, the enterprise application 420 may be executed by a computer device connected to the enterprise network 408 (e.g. clients 414).

In an embodiment, the client 414 may be any computer device that is connected to the enterprise network 408. The client 414 may be a desktop computer, a laptop computer, a tablet computer, a handheld computer, or the like. The client may provide an interface for the user to interface with the client 414, enterprise network 408, other network applications 422, enterprise applications 420, client applications 418, or the like. The client may also provide connections to connect to external resources that may include the policy management network server 402, the security management network sever 432, or the like.

In an embodiment, the client may have a file analysis facility 424B and a security analysis facility 440B that are substantially the same as the enterprise network 308 file analysis facility 424A and security analysis facility 440A. In an embodiment, the client 414 file analysis facility 424B and security analysis facility 440B may be copied from the enterprise network 408.

In an embodiment, the function of the file analysis facility 424B may function substantially the same as the file analysis facility 424A described previously.

In an embodiment, the function of the security analysis facility 440B may function substantially the same as the security analysis facility 440A described previously.

In an embodiment, the client applications 418 may be any application that is stored on the client 414 computer device. In an embodiment, the client applications 418 may be accessed by any computer device connected on the enterprise network 408.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer program product comprising a non-transitory computer readable medium having stored thereon computer executable code that, when executing on one or more computing devices, performs the steps of:
    organizing a number of applications into a number of application types including at least a messaging category, an electronic mail category, a word processing category, a database category, and a browser category;
    providing a policy management service for an enterprise network, the policy management service configured to provide protection services to one or more endpoints of the enterprise network;
    detecting an application executing on one of the endpoints;
    determining one of the number of application types for the application by comparing characteristics of functional blocks of the application to characteristics in an analysis database that is updated by the policy management service and that relates application characteristics to application type; and
    conditionally authorizing or performing a malicious code scan of the application on the endpoint according to one or more of rules of the protection services applicable to the one of the application types of the application executing on the endpoint.

2. A method comprising:
    organizing a number of applications into a number of application types;
    providing a policy management service for an enterprise network, the policy management service configured to provide protection services to one or more endpoints of the enterprise network;
    detecting an application executing on one of the endpoints;
    determining one of the number of application types for the application by comparing characteristics of functional blocks of the application to characteristics in an analysis database that is updated by the policy management service and that relates application characteristics to application type; and
    conditionally authorizing or performing a malicious code scan of the application on the endpoint according to one or more of rules of the protection services applicable to the one of the application types of the application executing on the endpoint.

3. The method of claim 2, wherein determining one of the number of application types for the application includes unpacking a file of the application.

4. The method of claim 2, wherein determining one of the number of application types for the application includes decompressing a file of the application.

5. The method of claim 2, wherein determining one of the number of application types for the application includes decrypting a file of the application.

6. The method of claim 2, wherein determining one of the number of application types for the application includes disassembling binary code of the application to recreate one or more functional blocks of the application and matching the one or more functional blocks to a phenotype representing one of the number of application types.

7. The method of claim 6, wherein the one or more functional blocks include one or more application programming interface calls and one or more string references.

8. The method of claim 6, wherein the one or more functional blocks illustrate a function and an execution flow for the application.

9. The method of claim 6, wherein the one or more functional blocks contains a combination of API calls and strings referenced within the one or more functional blocks.

10. The method of claim 6, wherein the one or more functional blocks are representative of at least one function and at least one execution flow of the application.

11. The method of claim 6, wherein the one or more functional blocks include a sequence of application program interface calls.

12. The method of claim 2, wherein the one or more rules of the protection services include at least one of a white list of acceptable applications, a white list of a group of application types, a black list of applications, or a black list of unacceptable application types.

13. The method of claim 2, wherein the application includes at least one of a network application and a web application.

14. The method of claim 2, wherein the malicious code scan of the application is conditionally authorized or performed once the application has been requested to execute.

15. The method of claim 2, wherein conditionally authorizing or performing the malicious code scan of the application includes quarantining the application.

16. The method of claim 2, wherein conditionally authorizing or performing the malicious code scan of the application includes terminating the application.

17. The method of claim 2, wherein conditionally authorizing or performing the malicious code scan of the application includes reporting the application to an administration facility.

18. A system comprising:
    a threat management facility storing information in a database organizing a number of applications into a number of application types, the threat management facility providing a policy management service including protection services for one or more endpoints of an enterprise network;
    a data network; and
    an endpoint coupled to the threat management facility through the data network the endpoint configured by computer executable code stored in a memory of the endpoint to perform the steps of detecting an application executing on the one of the endpoints, determining one of the number of application types for the application by comparing characteristics of functional blocks of the application to characteristics of application types in an analysis database that is updated by the policy management service and that relates application characteristics to application type, and conditionally authorizing or performing a malicious code scan of the application on the endpoint according to one or more of rules of the protection services applicable to the one of the application types of the application executing on the endpoint.

19. The system of claim 18, wherein the application includes at least one of a network application and a web application.

20. The system of claim 18, wherein determining one of the number of application types for the application includes disassembling binary code of the application to recreate one or more functional blocks of the application and matching the one or more functional blocks to a phenotype representing one of the number of application types.

* * * * *